June 29, 1965  F. C. RAY  3,191,893
METHOD AND APPARATUS FOR WELDING THE JOINT IN A WIRE CLOTH
Filed May 12, 1961
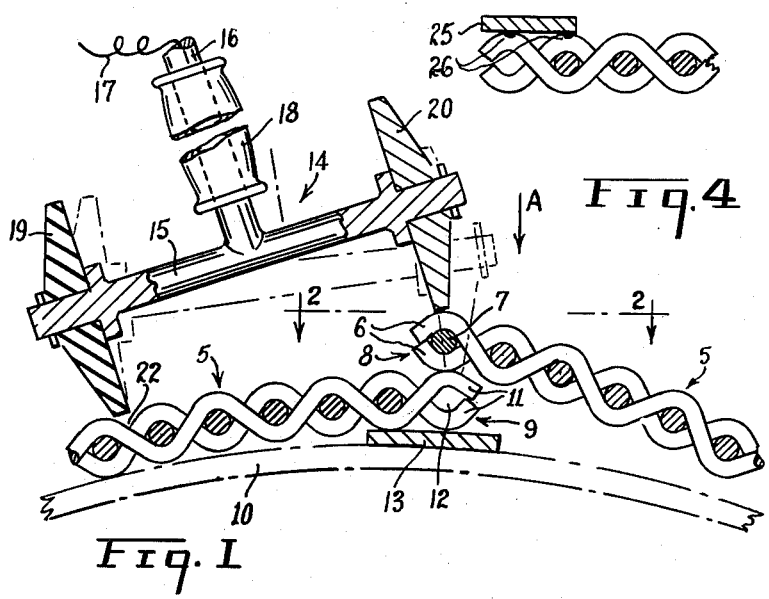
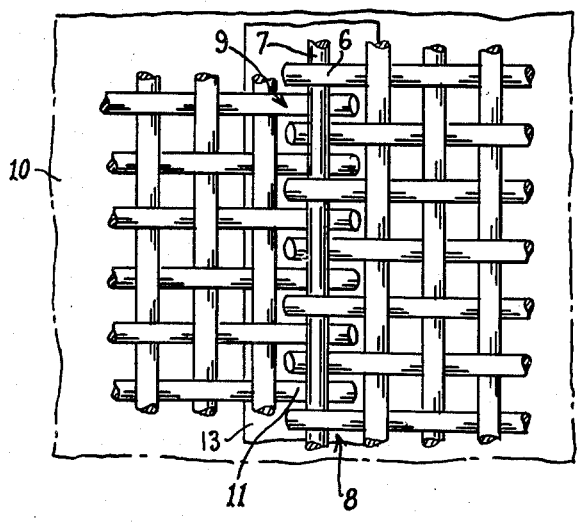
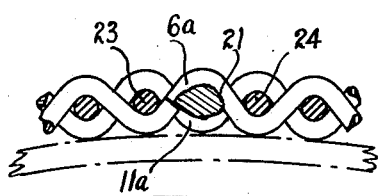
INVENTOR
F. C. RAY

United States Patent Office 3,191,893
Patented June 29, 1965

3,191,893
METHOD AND APPARATUS FOR WELDING THE JOINT IN A WIRE CLOTH
Frederick Charles Ray, Ashton-on-Mersey, Sale, England, assignor to The Johnson Wire Works Limited, Montreal, Quebec, Canada
Filed May 12, 1961, Ser. No. 109,759
3 Claims. (Cl. 245—10)

This invention relates to the method and apparatus for welding or brazing the joint in a wire cloth belt and particularly suited for joining the ends of a length of wire cloth which is wrapped about cylinder drums such as are used in washing pulp.

The invention consists essentially in first cutting a length of woven wire to the desired length required for wrapping about the cylinder drum and to provide an overlap and then removing the end weft strand from each end of the cut to length wire cloth. One of the removed weft strands is replaced by a strand of welding or brazing material such as a strand of silver solder, the prepared length of wire cloth is then wrapped about the cylinder so that the end of the wire cloth having the strand of welding material, replacing the withdrawn weft strand, overlays that portion of the other end of the wire cloth which is without an end weft strand, with the overlapped end of the wire cloth resting on a strip of steel or other high resistance metal inserted between the surface of the cylinder and the wire cloth. The overlapped ends of the wire cloth are arranged so that the ends of the warp strands of one end of the wire are staggered with relation to the ends of the warp strands of the other end of the wire. A heating apparatus of any suitable type is moved along the overlapped ends of the wire cloth and may include a current carrying axle member connected by suitable means to a source of welding current. This axle member is provided with a pair of wheels, one of which is of non-conductive material and the other of conductive material, the latter being in rotating contact with the end of the wire through which the strand of welding material is threaded. Alternatively, the wheeled apparatus may not be connected to a source of electric current but may be used in conjunction with a hand operated torch, with the torch being guided along the joint in front of the wheeled apparatus. The heat from the heating apparatus is sufficient to melt the strand of welding material and, as the welding material melts, the overlying end of the wire is pressed into linear alignment with the underneath end of the wire, with the welding material surrounding the interleaved ends of the warp strands and solidifying behind the forward movement of the heating apparatus. The resulting joint is confined to between the top and bottom surface planes of the wire cloth and within the space of one weft strand, so that there is no blockage of drainage in the wire cloth.

Alternatively, after the end weft strands have been withdrawn, a strip of welding or brazing material may be attached to the surface of one end of the wire cloth in any suitable manner and covering the space vacated by the withdrawn weft strand.

The object of the invention is to provide a welded joint in a wire cloth which will be confined between the normal surface planes of the wire in order to eliminate any ridge or blockage of drainage.

A further object of the invention is to provide a welded joint for wire cloths which will be uniform throughout the whole length of the joint and which will give a minimum of resistance to flexing of the wire as it travels over its end rolls where the wire cloth is used as a moving belt.

A further object of the invention is to substitute a strand of welding material for one of the weft strands at one end of a length of woven wire cloth before it is formed into a loop, and after forming the loop, press and weld the strand of welding material into welding engagement with the adjacent other end of the looped wire to complete the weld joint of the wire.

A further object of the invention is to bring the ends of a length of wire cloth into joining alignment to form a closed loop with the ends of the individual warp strands of one end of the wire being staggered in relation to the ends of the individual warp strands of the other end of the wire within the space normally occupied by a single weft strand and substituting for the normal weft strand, a strand of welding material and subjecting the joined ends of the wire to heat and pressure.

A further object of the invention is to provide a length of woven wire cloth whose opposite ends are prepared for welding or brazing together before the wire cloth is formed into a loop.

These and other objects of the invention will be apparent from the following detailed specification and accompanying drawings, in which:

FIG. 1 is an enlarged vertical section of the overlapped ends of a length of wire cloth in position for the welding of a joint between them and showing one form of welding apparatus in position for the welding operation and also showing in chain dot lines the position of the welding apparatus when welding of the joint takes place.

FIG. 2 is a plan view taken on the line 2—2 of FIG. 1 and showing a strand of welding material substituted for one of the normal weft strands and overlying the adjacent end of the wire cloth from which a weft strand has also been withdrawn.

FIG. 3 is an enlarged vertical section of the completed welded joint.

FIG. 4 shows an alternate method of applying the strip of welding or brazing material to one end of the woven wire cloth.

Referring to the drawings, after the woven wire 5 has been cut to the desired length necessary to form the wire cloth, one end weft strand is removed from one end of the cut length, leaving a short length of the crimped warp strands 6 unsupported by a weft strand. A strand of welding material 7, such as silver solder, is substituted for the normal weft strand which has been removed from the cut length of wire cloth.

The two ends 8 and 9 of the wire cloth 5 are brought together about the surface of the cylinder mould 10, and are clamped to the cylinder mould by any suitable means, not shown. The end 9 of the wire cloth which is to underlie the end 8 is trimmed to provide the desired amount of overlap of the two ends, and one weft strand is withdrawn, leaving a short length of crimped warp strands 11 unsupported by a weft strand as shown at 12 in FIG. 1. The other end 8 of the wire cloth through which the strand of welding material 7 has been threaded, is laid in overlapping contact with the end 9 of the wire cloth and the ends of the warp strands 6 are staggered in the transverse direction so that they lie immediately above and over the space between the ends of the warp strands 11 projecting from the end 9 of the wire cloth. The strand of welding material 7 is therefore resting in direct contact with the projecting ends of warp strands 6 of the end 9 of the wire cloth.

A strip of steel 13 is inserted under the overlapped ends 8 and 9 to provide a rigid and smooth surface for support of the overlapped ends of the wire cloth and to protect the surface of the cylinder mould 10 during welding of the joint.

A welding device of any well known type may be used to weld the joint of the wire cloth, and is here shown as consisting of a current carrying head 14 comprising an axle 15 connected through the shank 16 with the lead wire 17 to a source of welding current, not shown. A grip handle 18 on the shank 16 permits the device to be guided by hand while the joint is being welded. A pair of wheels 19 and 20 are journalled on the axle 15 in spaced apart relation as shown in FIG. 1. The wheel 19 is made of non-conductive material such as hard rubber or fibre, while the wheel 20 is made of conductive material such as copper or carbon. The axle 15 and wheels 19 and 20 are aligned in such a manner that the axle is disposed transversely of the overlapped ends 8 and 9 of the wire, with the conductive wheel 20 resting on the end 8 of the wire immediately over the strand of welding material 7. Hand pressure applied to the device 14 forces the wheel 20 to move downwards in the direction of the arrow A, shown in FIG. 1, as the strand of welding material 8 is melted. As the welding of the joint progresses, the steel strip 13 can be withdrawn from under the joint.

A welding torch may be substituted for the electric welding carried out by the device above described. When a torch is used for welding, the device 14, without being connected to a source of electric current, follows behind the torch to apply downward pressure on the joint while it is still hot and the welding material still soft.

An alternative method of preparing the ends of the wire cloth for welding or brazing is illustrated in FIG. 4. In this alternative method, the end weft strands are withdrawn as described above. However, in place of inserting a strand of welding material 7 as shown in FIGS. 1 and 2, a strip of welding or brazing material 25 is attached to either the top or bottom surface of the wire cloth in the area from which the weft strand has been withdrawn. In FIG. 4 the strip 25 is shown attached to the top surface of the wire cloth by spot welding at 26. This has the advantage that the heat first contacts the welding strip and protects the adjacent areas of the wire cloth from being burned.

In the operation of welding the joint between the ends of the wire cloth 5, and before the wire cloth is fitted about the cylinder mould 10, the end weft strand is first removed from one end of the length of woven wire and a strand of welding material 7 is threaded through the crimped ends of the warp strands 6 to replace the removed weft strand, here shown as being threaded through the warp strands in the end 8 of the wire cloth. The prepared length of wire cloth is then fitted about the cylinder mould 10 and clamped thereon in any suitable manner so that the end 9 of the wire is resting in contact with the steel strip 13 and the end 8 of the wire overlaps the end 9, as shown in FIG. 1, with the ends of the warp strands 6 in the end 8 being staggered in relation to the ends of the warp strands 11 of the other end 9 of the wire, as seen in FIG. 2.

The device 14 is now positioned at one end of the overlapped joint, with the wheel 20 aligned to travel along the joint in the line of the strip 7 of welding material. The wheel 19 is constrained to run in a hollow 22 of the woven wire parallel with the joint and thereby hold the wheel 20 to movement along the joint. The joint is heated either by electric current or by a torch, the heat causes the strip 7 to melt and flow into the spaces between the staggered ends of the warp strands 6 and 11 and at the same time the pressure of the wheel 20 in the direction of the arrow A, FIG. 1, will force the end 8 of the wire downwards into linear alignment with the end 9. As the device 14 moves along the joint, the welding material hardens into a solid mass 21 in which the ends 6a and 11a of the warp strands 6 and 11 are firmly embedded, as shown in FIG. 3. The reformed mass of welding material 21 is confined to an area between the upper and lower surface planes of the aligned ends of the wire and is also confined to a relatively narrow width and separate from the adjacent weft strands 23 and 24 so as not to block the drainage openings through the wire in the area of the joint.

When the wire cloth has been prepared as above described and of a predetermined length, the operation of fitting it about a cylinder mould is greatly simplified and the time required to fit it about the cylinder mould and weld the ends together is greatly reduced.

What I claim is:

1. The method of welding the joint in a wire cloth woven of warp and weft strands comprising, cutting a length of woven wire cloth to the desired length, removing one end weft strand from each end of the cut wire cloth leaving a series of projecting substantially closed crimped ends to the warp strands, substituting a strand of welding material for one of the removed weft strands, the said substituted strand of welding material being threaded through and firmly held in the closed crimped ends of the warp strands, bringing the ends of the wire cloth together to form a loop so that the end portions of the wire cloth are located one above the other, and applying heat and pressure to the overlapped ends of the wire cloth to fuse the strand of welding material and bring the ends of the wire cloth into linear alignment with each other.

2. The method of welding the joint in a wire cloth woven of warp and weft strands comprising, cutting a length of woven wire cloth to the desired length, removing one end weft strand from each end of the cut wire cloth leaving a series of projecting substantially closed crimped ends to the warp strands, substituting a strand of welding material for one of the removed weft strands, the said substituted strand of welding material being threaded through and firmly held in the closed crimped ends of the warp strands, bringing the ends of the wire cloth together to form a loop so that the end containing the substituted strand of welding material overlaps the end of the wire cloth which is short of a weft strand, and applying heat and pressure to the overlapped ends of the wire cloth to fuse the strand of welding material and bring the ends of the wire cloth into linear alignment with each other.

3. The method of welding the joint in a wire cloth woven of warp and weft strands comprising, cutting a length of woven wire cloth to the desired length, removing one end weft strand from each end of the cut wire cloth leaving a series of projecting substantially closed crimped ends to the warp strands, substituting a strand of welding material for one of the removed weft strands, the said substituted strand of welding material being threaded through and firmly held in the closed crimped ends of the warp strands, bringing the ends of the wire cloth together to form a loop so that the end containing the substituted strand of welding material overlaps the end of the wire cloth which is short of a weft strand and with the projecting ends of the warp strands in one end of the wire cloth being staggered transversely of the warp strands of the other end of the wire cloth, and applying heat and pressure to the overlapped ends of the wire cloth to fuse the strand of welding material and bring the ends of the wire cloth into linear alignment with each other.

References Cited by the Examiner

UNITED STATES PATENTS

| | | | |
|---|---|---|---|
| 1,603,687 | 10/26 | Green | 245—10 |
| 1,972,530 | 9/34 | Longoria | 245—10 |
| 2,020,894 | 11/35 | Kurtz | 245—10 |
| 2,162,947 | 6/39 | Gleeson | 245—10 |
| 2,224,323 | 12/40 | Taylor | 245—10 |
| 2,572,593 | 10/51 | Brown | 113—59 |
| 2,657,660 | 11/53 | Crowe | 113—59 |
| 2,893,664 | 7/59 | Gerhauser | 140—112 |

CHARLES W. LANHAM, *Primary Examiner.*

JOHN F. CAMPBELL, *Examiner.*